US008930423B1

(12) United States Patent
Surampudi et al.

(10) Patent No.: US 8,930,423 B1
(45) Date of Patent: Jan. 6, 2015

(54) METHOD AND SYSTEM FOR RESTORING ENCRYPTED FILES FROM A VIRTUAL MACHINE IMAGE

(75) Inventors: Sridhar Surampudi, Andhra Pradesh (IN); Timothy M. Naftel, Longmont, CO (US)

(73) Assignee: Symantec Corporation, Mountain View, CA (US)

( * ) Notice: Subject to any disclaimer, the term of this patent is extended or adjusted under 35 U.S.C. 154(b) by 1323 days.

(21) Appl. No.: 12/346,133

(22) Filed: Dec. 30, 2008

(51) Int. Cl.
*G06F 17/30* (2006.01)
*H04L 29/06* (2006.01)
*H04K 1/00* (2006.01)
*H04L 9/00* (2006.01)

(52) U.S. Cl.
USPC ........... 707/821; 707/757; 707/825; 707/827; 707/828; 713/165; 713/153; 380/259; 380/277; 380/278

(58) Field of Classification Search
CPC .................................. G06F 17/30; G06F 17/00
USPC .......................... 707/640, 674, 675, 679, 686
See application file for complete search history.

(56) References Cited

U.S. PATENT DOCUMENTS

| | | | | |
|---|---|---|---|---|
| 5,918,229 | A * | 6/1999 | Davis et al. .................... | 705/27.1 |
| 6,615,365 | B1 * | 9/2003 | Jenevein et al. .............. | 714/6.11 |
| 7,634,521 | B1 * | 12/2009 | Spertus et al. ......................... | 1/1 |
| 7,743,035 | B2 * | 6/2010 | Chen et al. ..................... | 707/674 |
| 7,810,133 | B2 * | 10/2010 | Carter et al. ........................ | 726/2 |
| 8,185,684 | B1 * | 5/2012 | Naftel ............................... | 711/6 |
| 8,676,809 | B1 * | 3/2014 | Naftel ........................... | 707/746 |
| 2001/0014158 | A1 * | 8/2001 | Baltzley ........................ | 380/281 |
| 2004/0003314 | A1 * | 1/2004 | Witt et al. .......................... | 714/6 |
| 2004/0059866 | A1 * | 3/2004 | Patel et al. ..................... | 711/100 |
| 2004/0091114 | A1 * | 5/2004 | Carter et al. ................... | 380/259 |
| 2005/0278525 | A1 * | 12/2005 | Douceur et al. ............... | 713/153 |
| 2006/0190502 | A1 * | 8/2006 | Long et al. ..................... | 707/204 |
| 2006/0242179 | A1 * | 10/2006 | Chen et al. ..................... | 707/100 |
| 2008/0126445 | A1 * | 5/2008 | Michelman ................... | 707/204 |
| 2008/0157988 | A1 * | 7/2008 | Lai .................................. | 340/635 |
| 2008/0307020 | A1 * | 12/2008 | Ko et al. ........................ | 707/204 |
| 2008/0307030 | A1 * | 12/2008 | Ziv .................................. | 708/505 |
| 2009/0110198 | A1 * | 4/2009 | Garimella et al. ............. | 380/277 |
| 2009/0164529 | A1 * | 6/2009 | McCain ......................... | 707/204 |
| 2010/0262797 | A1 * | 10/2010 | Rosikiewicz et al. .......... | 711/162 |
| 2010/0325732 | A1 * | 12/2010 | Mittal et al. ..................... | 726/26 |

FOREIGN PATENT DOCUMENTS

WO    WO 2008/019176    *    2/2008

OTHER PUBLICATIONS

Matt Blaze, A cryptographic file system for UNIX, Proceedings of the 1st ACM conference on Computer and communications security, p. 9-16, Nov. 3-5, 1993, Fairfax, Virginia, United States [doi>10.1145/168588.168590].*
Spertus et al., "Technique for Scanning Stealthed, Locked and Encrypted Files," U.S. Appl. No. 11/413,455, filed Apr. 27, 2006.

* cited by examiner

*Primary Examiner* — Srirama Channavajjala
(74) *Attorney, Agent, or Firm* — Campbell Stephenson LLP

(57) ABSTRACT

Various techniques, including a method, system and computer program product for restoring encrypted files are disclosed. The method includes accessing a file table record for an encrypted file. The file table record includes an encrypted file stream and extent information identifying a location of one or more portions of the encrypted file in a virtual machine image. In response to accessing the file table record a consecutive data stream is stored. Storing the consecutive data stream includes encapsulating the encrypted file stream and the one or more portions of the encrypted file.

20 Claims, 6 Drawing Sheets

METHOD AND SYSTEM FOR RESTORING ENCRYPTED FILES FROM A VIRTUAL MACHINE IMAGE

BACKGROUND OF THE INVENTION

1. Field of the Invention

This invention relates to image backup systems and, more particularly, to restoration of encrypted files stored within a virtual machine image.

2. Description of the Related Art

Backup systems are used to protect data against loss. Typically, a backup system includes software that copies volume images to a backup storage device (e.g., such as a tape drive). If data is lost (e.g., due to user error or device failure), the backed-up image of the data can be retrieved from the backup storage device and restored as an entire image. Once the backed-up image is restored, specific files can be restored from the image to the original file system. Alternatively, some backup systems are sometimes able to restore some individual unencrypted files directly from a backup image.

Unfortunately, the existence of encrypted files has complicated the restoration of individual files from within a backup image. Systems for the restoration of encrypted files from a backup image frequently fail in restoring an individual encrypted file due to restrictions imposed by operating system security rights. Restoration of an individual file frequently fails unless the entire backup image is restored and the desired encrypted file is then extracted from the restored image. These limitations undermine the ability to efficiently restore individual encrypted files from a full image, and users are frequently required to undertake the time-consumptive and disruptive use of a full image restore to retrieve an individual encrypted file, restoring more data than is desired in a manner that wastes time and system resources.

BRIEF DESCRIPTION OF THE DRAWINGS

A more complete understanding of the present method, system and computer program product for restoring encrypted files from a virtual machine image may be acquired by referring to the following description and the accompanying drawings, in which like reference numbers indicate like features.

Figure 1:
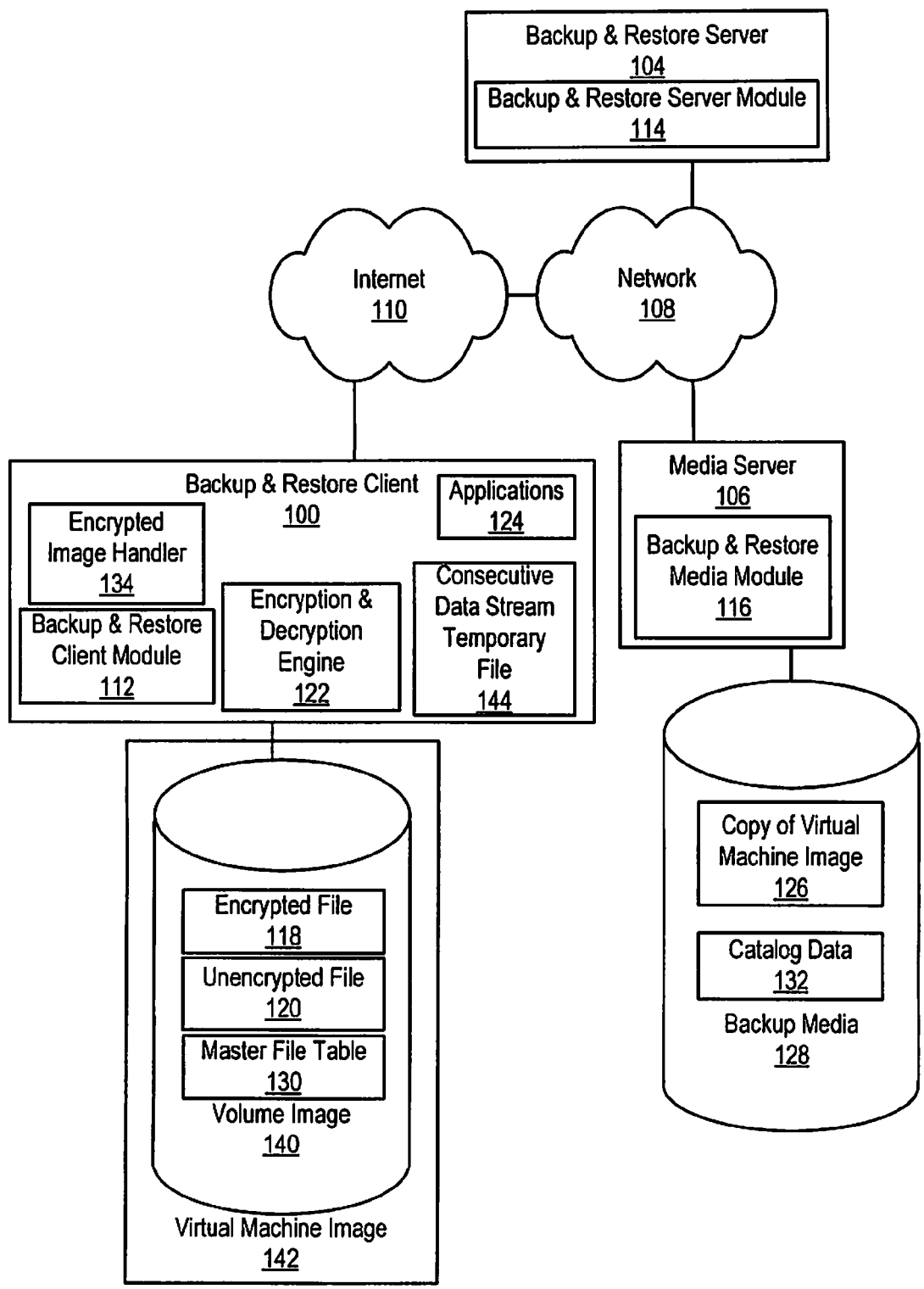
FIG. 1 illustrates a block diagram of a system for restoring encrypted files from a virtual machine image according to one embodiment of the present invention.

While the present invention is susceptible to various modifications and alternative forms, specific embodiments are provided as examples in the drawings and detailed description. It should be understood that the drawings and detailed description are not intended to limit the present invention to the particular form disclosed. Instead, the intention is to cover all modifications, equivalents and alternatives falling within the spirit and scope of the present invention as defined by the appended claims.

DETAILED DESCRIPTION

The present invention facilitates restoration of an encrypted file that is saved as part of a copy of a virtual machine image during a backup operation without requiring restoration of an entire virtual machine image containing encrypted files. An encrypted file or multiple encrypted files is restored by aggregating encrypted sectors, obtained by accessing the copy of the virtual machine image, and storing the aggregated encrypted section as a temporary file. This temporary file is then written as a restored encrypted file in a single write operation. The restored encrypted file can then be decrypted to generate an unencrypted file. Additionally, applications, such as security software or data comparison applications, are able to access the restored file. Such applications can perform activities on the restored file ranging from virus scans to version management and document updates.

One embodiment of a method for restoring an encrypted file includes accessing a file table record for an encrypted file that is stored in a copy of a virtual machine image. The file table record includes an encryption key (e.g., from an $EFS stream, where the notation "$EFS" indicates a variable representing an encrypted file system datastream) and a catalog of information identifying a location of each of one or more portions of the encrypted file (e.g., clusters). As used herein, a cluster is the unit of disk space allocation for files and directories. The method further includes storing a consecutive data stream in response to accessing the file table record. The consecutive data stream encapsulates the encryption key, primary data stream, and any alternate data streams such that the consecutive data stream is compatible with, for example, the Microsoft Windows™ EFS (Encrypted File System).

In one embodiment, a volume image, stored on a media server, is accessed by a client in response to commands from a supervisory server. FIG. 1 is a block diagram of a data storage system configured for restoring encrypted files from a virtual machine image. The components in FIG. 1 can perform backups, full restores from backups, and selective restores of individual files from backups. FIG. 1 includes a backup and restore client 100, a backup and restore server 104, and a media server 106. Backup and restore server 104 and media server 106 are coupled by a network 108. In some embodiments, backup and restore client 100 can also connect directly to network 108. However, in the and non-limiting embodiment portrayed in FIG. 1, backup and restore client 100 is instead coupled to network 108 by Internet 110. As a result of connection to Internet 110, backup and restore client 100 can communicate with backup and restore server 104 and media server 106 (e.g., using a variety of techniques ranging from FTP (File Transfer Protocol) and HTTP (Hypertext Transfer Protocol) to email and instant messaging), even though backup and restore client 100 does not have direct access to network 108.

Network 108 can include one or more WANs (Wide Area Networks), LANs (Local Area Networks), and/or one or more SANs (Storage Area Networks). Network 108 can be implemented using various media, including coaxial cables, fiber optic cables, and wireless links. In general, an embodiment of network 108 presents a network that allows various computing devices to communicate with each other as well as with the backup system that includes backup and restore server 104. Network 108 may implement various security techniques, such as firewall techniques.

As shown, backup and restore client 100, backup and restore server 104, and media server 106 each include backup and restore agents implemented by backup and restore client module 112, backup and restore server module 114 and backup and restore media module 116, respectively. An agent can include any software or instructions used to implement an embodiment of the present invention. Backup and restore client module 112 and backup and restore media module 116 typically receive instructions from backup and restore server module 114 and handle the extraction of data from and placement of data on backup and restore client 100. Together, backup and restore client module 112, backup and restore server module 114 and backup and restore media module 116 can backup and restore information stored on backup and restore client 100. In one embodiment, backup and restore client module 112, backup and restore server module 114, backup and restore media module 116 are implemented using VERITAS NetBackup™ or VERITAS BackupExec™ software, available from Symantec Corporation of Cupertino, Calif.

Backup and restore client 100 is coupled to (or, alternatively, includes) a storage device that contains a virtual machine image 142. Virtual machine image 142 represents one or more virtual drives that will contain one or more volume images, such as volume image 140. Volume image 140 is a logical storage device that stores one or more files, including, in one embodiment, an encrypted file 118, an unencrypted file 120, and a master file table 130. In one embodiment, unencrypted file 120 is created when encrypted file 118 is decrypted by encryption and decryption engine 122, or vice versa. Volume image 140 can include all or part of one or more logical or physical storage devices (e.g., in one embodiment, volume image 140 is implemented on several independent virtual drives). Applications 124 executing on backup and restore client 100 can access (e.g., read and write) files, including encrypted file 118 and unencrypted file 120 stored on volume image 140.

Backup and restore server 104 includes backup and restore server module 114, which initiates backups of virtual machine image 142 to storage locations such as a copy of virtual machine image 126 on backup media 128 managed by backup and restore media module 116. In one embodiment, copy of virtual machine image 126 is a single virtual drive that contains a single volume. Copy of virtual machine image 126 can be stored as a single flat file containing blocks (e.g., clusters) of data representing the content of multiple files on a volume, such as encrypted file 118 and unencrypted file 120 of volume image 140. In such a scenario, during a backup operation, backup and restore client module 112 reads virtual machine image 142 as individual files, and backup and restore media module 116 writes the contents of virtual machine image 142 to copy of virtual machine image 126 as a single flat file containing blocks of data representing the content of multiple files on virtual machine image 142. In one embodiment of a file restore process, backup and restore media module 116 reads only the necessary sectors or clusters needed to restore selected files from copy of virtual machine image 126 to virtual machine image 142.

Subsequently, backup and restore server module 114 can cause backup and restore client module 112 and backup and restore media module 116 to restore the extents of encrypted file 118 on volume image 140 from copy of virtual machine image 126. An extent is a contiguous area of storage in a computer file system reserved for a file, and extent information identifies the location of an extent or extents. In one embodiment, backup and restore client module 112 performs operations related to the handling of extents on copy of virtual machine image 126 representing encrypted file 118 through operation of an encrypted image handler 134 and a consecutive data stream temporary file 144 on backup and restore client 100. Backup and restore client module 112 generates and sends backup information without user assistance or prompting from backup and restore server module 114. The backup transaction can be transparent to the user of backup and restore client 100, such that the user is unaware that backup and restore client module 112 is sending data to backup and restore media module 116 (or vice versa).

In one embodiment, encrypted image handler 134 creates consecutive data stream temporary file 144 on backup and restore client 100. While the embodiment portrayed in FIG. 1 is described with reference to encrypted image handler 134, the functions performed by encrypted image handler 134 may be integrated into other modules, such as backup and restore client module 112 or an operating system (not shown), executing on backup and restore client 100.

A restored version of encrypted file 118 can be made available to applications 124 for performing on encrypted file 118 a wide range of functions, such as version monitoring, virus scans, or any other activities that will vary from embodiment to embodiment of the present invention. A restored version of encrypted file 118 may be decrypted by encryption and decryption engine 122.

It is noted that, in some embodiments, backup and restore client 100 will participate in traditional network-based backup techniques whenever backup and restore client 100 is directly connected to network 108. Backup and restore client module 112 generates and sends backup information without user assistance or prompting from backup and restore server module 114. The backup transaction can be transparent to the user of backup and restore client 100, such that the user is unaware that backup and restore client module 112 is sending data to backup and restore media module 116 (or vice versa). In some such embodiments, backup and restore client module 112 can detect whether backup and restore client 100 is directly connected to network 108 and select which type of backup techniques to use dependent upon whether a direct connection to network 108 is present. Similarly, if restores are being performed, backup and restore server module 114 can detect whether backup and restore client 100 is currently present in the network 108. While the embodiment explained herein is explained with reference to a networked environment, in alternative embodiments, functions explained as residing on separate servers and clients and being performed across a network will be housed and performed within a single physical machine.

Backup media 128 can include sequential storage media such as magnetic tape as well as a pool of random access media such as hard disk drives, optical disks (e.g., CDs (Compact Discs) and DVDs (Digital Versatile Discs), and the like). When backup and restore client 100 is not directly connected to network 108, backup and restore client module 112 can be configured to send data (e.g., virtual machine image 142) that is to be backed up to copy of virtual machine image 126 on backup media 128 using a variety of techniques ranging from FTP and HTTP to email and instant messaging. In particular, backup and restore client module 112 is configured to collect the necessary data and metadata, which describes the data, and send the data and metadata to backup and restore media module 116.

Alternative embodiments can include an autonomously-operated a backup and restore client module, an encryption and decryption engine, a consecutive data stream temporary file, a volume, a virtual machine image and a backup and restore media module for controlling backup media (such as a tape drive supporting removable tapes) within a single physical computing system and without the need for connection to a network. Many of these components and their functions may be combined into alternative forms or integrated into other programs such as applications or an operating system. In one embodiment, instructions for implementing many of these components and their functions may be combined into a special-purpose physical circuit. Each such embodiment may implement the present invention without departing from the scope of the recited claims.

In one embodiment, encrypted data sectors from copy of virtual machine image 126 are located by backup and restore client module 112 using catalog data 132. Catalog data 132 can also indicate whether a file is encrypted and can contain both mapping information and a public encryption key. FIG. 2 shows a block diagram of a master file table, such as the MFT of NTFS (Master File Table of the New Technology File System used by Microsoft Windows™). Master file table 230 is one example of catalog data 132. Master file table 230 contains a set of n master file table records, starting with MFT record zero 200(0) and proceeding through MFT record n−1 200(n−1), where the record designator number (0 through n−1) is referred to as a "recode number." Note that, where the numerical notation (n) is used in the present application, it is provided to indicate a group of objects, without necessarily specifying a consistent quantity between different instances of notation (n).

While some master file table records are associated with directories, others are associated with files (such as encrypted file 118 of FIG. 1) through attributes that represent the file. MFT records associated with files, such as MFT record ninety-nine 200(99) will typically contain a set of attributes distinct from the attributes contained within MFT records associated with directories, such as MFT record seventy-four 200(74). Attributes stored within a particular record of master file table 230 are referred to as resident attributes, and attributes stored outside a particular record of master file table 230 are referred to as nonresident attributes. When file attributes are too large for one particular record of master file table 230, the attributes are stored in clusters of disk space outside of master file table 230 but within a volume image (such as volume image 126 of FIG. 1).

In one embodiment, the first sixteen master file table records (0-15) are reserved for special files used by the file system. In particular, an MFT record five 200(5), also commonly referred to as index 5, of master file table 230 is the root directory folder and includes index information for locating the next directory level on the volume in the directory structure.

For the purpose of more clearly explaining the functions of master file table 230, assume that master file table 230 represents an example of a directory structure in which the root directory represented by MFT record five 200(5) contains a reference to a "documents" directory that is stored in MFT record seventy-four 200(74). Further assume that the "documents" directory that is stored in MFT record seventy-four 200(74) contains a reference to a file called "status.doc" and a file called "plans.doc." In such an example, MFT record seventy-four 200(74) contains the information for locating content of "status.doc" at path "documents\status.doc" and locating the data of "plans.doc" at path "documents\plans.doc," where the file "status.doc" is stored in MFT record seventy-five 200(75). In this example, the file "plans.doc" is stored in MFT record ninety-nine 200(99). Thus, following the example, to access the file stored in MFT record ninety-nine 200(99), MFT record five 200(5) is accessed to retrieve the location for the "documents" directory at MFT record seventy-four 200(74), and MFT record seventy-four 200(74) is then accessed to retrieve the location of data for "plans.doc," which is stored in MFT record ninety-nine 200(99).

In one embodiment, each of the n MFT records is zero-based and of a fixed size. A zero-based record has an index number greater than zero and less than n. In the example illustrated in FIG. 2a, each MFT record has a length of 1 kB (kilobyte). In order to locate a particular MFT record, the recode number for the record is multiplied by the fixed length of all records in order to generate a byte offset specifying the location of the record at which reading of the record begins. For instance, to locate the beginning of MFT record five 200(5), the recode number for MFT record five 200(5) is multiplied by the fixed length of 1 kb per record to calculate a byte offset of 5 kB, which means that MFT record five 200(5) begins after the first five kB of master file table 230.

Thus, beginning at MFT record five 200(5), a full path name to a selected file can be indexed through the directory records to determine the location of the record of a selected file in the master file table 230. A full path provides the location in a directory structure of a selected file.

Figure 2A:
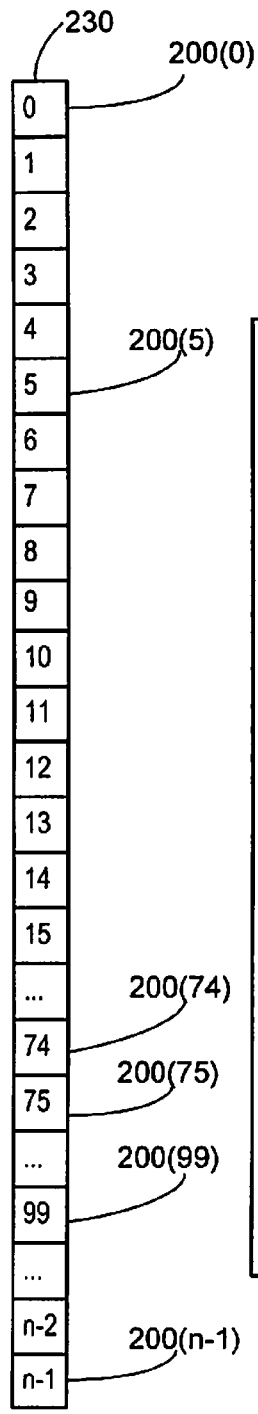
FIG. 2a depicts a block diagram of a master file table for use with a system and method for restoring encrypted files from a virtual machine image.
Figure 2B:
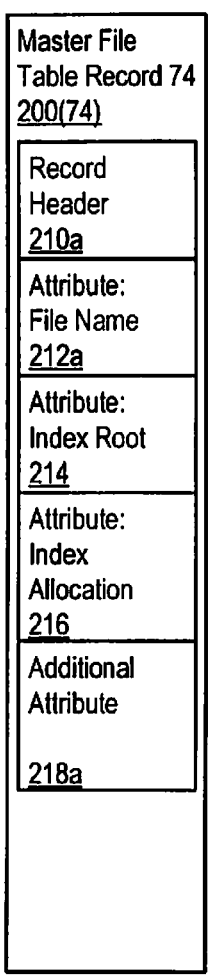
FIGS. 2b-2d depict block diagrams of master file table records for use with a system and method for restoring encrypted files from a virtual machine image.

Each master file table record is composed of a header and attributes. FIG. 2b depicts a block diagram of first MFT record. MFT record seventy-four 200(74) contains a record header 210a that identifies the beginning of MFT record seventy-four 200(74). MFT record seventy-four 200(74) contains a file name attribute 212a. In the specific example described above, file name attribute 212a would identify MFT record seventy-four 200(74) as being associated with the "documents" directory with a parent index of MFT record five 200(5). MFT record seventy-four 200(74) contains an index root attribute 214 containing resident directory entries that describe the locations of content that is part of the directory represented by MFT record seventy-four 200(74). In the specific example described above, index root attribute 214 would contain resident directory entries for the location of directories and files in the "documents" directory. MFT record seventy-four 200(74) contains an index allocation attribute 216. In the specific example described above, index allocation attribute 216 would contain a cluster run, which is a grouping of data, of non-resident directory entries. Finally, an additional attribute 218a is shown. Additional attribute 218a allows for the existence of additional resident and non-resident attributes within MFT record seventy-four 200(74) with data that will vary from embodiment to embodiment.

Figure 2C:
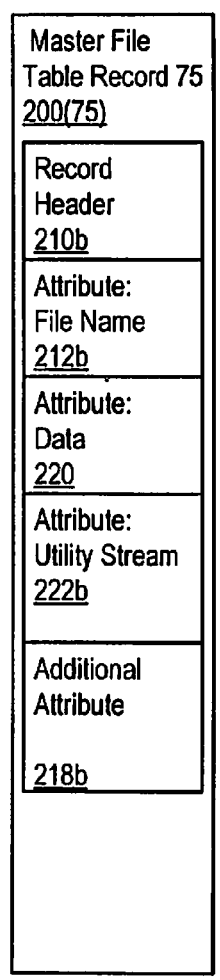

FIG. 2c depicts a block diagram of a second MFT record. MFT record seventy-five 200(75) contains a record header 210b for identifying the beginning of MFT record seventy-five 200(75). MFT record seventy-five 200(75) contains a file name attribute 212b. In the specific example described above, file name attribute 212b would identify MFT record seventy-five 200(75) as being associated with the "status.doc" file with a parent index of MFT record seventy-four 200(74).

Data attribute 220 contains a cluster run of non-resident encrypted data, which, in one embodiment, forms part of a primary data stream. Utility stream attribute 222b contains embedded $EFS data. Finally, an additional attribute 218b allows for the existence of additional resident and non-resident attributes within MFT record seventy-five 200(75) with data that will vary from embodiment to embodiment.

Figure 2D:
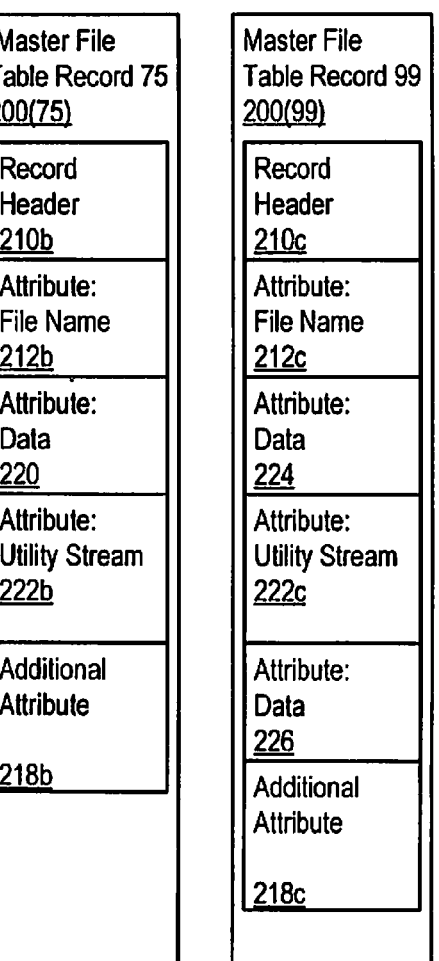

FIG. 2d depicts a block diagram of a third MFT record for use with a system and method for restoring encrypted files from a virtual machine image. MFT record ninety-nine 200 (99) contains a record header 210c for identifying the beginning of MFT record ninety-nine 200(99). MFT record ninety-nine 200(99) contains a file name attribute 212c. In the specific example described above, file name attribute 212b would identify MFT record ninety-nine 200(99) as being associated with the "plans.doc" file with a parent index of MFT record seventy-four 200(74). Data attribute 224 contains a cluster run of non-resident encrypted data. Utility stream attribute 222c contains a cluster-run of non-resident $EFS data. Data attribute 226 represents an alternate data stream that contains a cluster run of non-resident encrypted data, such as a symmetric private file encryption key. Finally, an additional attribute 218c allows for the existence of additional resident and non-resident attributes within MFT record seventy-five 200(99) with data that will vary from embodiment to embodiment.

Returning to the embodiment presented in FIG. 1, consecutive data stream temporary file 144 is accessed only by backup and restore client module 112 and encrypted file image handler 134, and access to the content of consecutive data stream temporary file 144 is provided through encrypted file 118 (after restoration) or unencrypted file 120 (after decryption by encryption and decryption engine 122). In alternative embodiments, applications 124 running on backup and restore client 100 can directly access the content of consecutive data temporary file 144 to perform various application functions.

Figure 3:
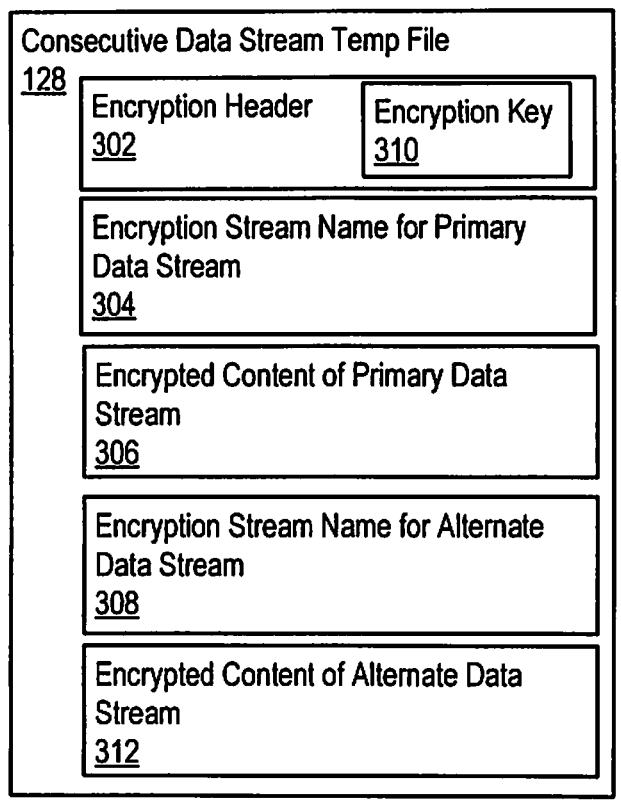
FIG. 3 illustrates a block diagram of a consecutive data stream temporary file for use with a system and method for restoring encrypted files from a virtual machine image according to one embodiment of the present invention.

FIG. 3 is a block diagram of a consecutive data stream temporary file. Consecutive data stream temporary file 144 contains an encryption header 302, which is used to indicate that the following data is encrypted. Encryption header 302 contains an encryption key 310, which is obtained from a utility stream, such as utility stream 222b of FIG. 2c. Encryption key 310 is used by an encryption and decryption engine, such as encryption and decryption engine 122 of FIG. 1, to encrypt an unencrypted file (such as unencrypted file 120 of FIG. 1) or decrypt an encrypted file 118 (such as encrypted file 118 of FIG. 1). Consecutive data stream temporary file 144 further contains an encryption stream name for a primary data stream 304, which indicates that the data following is part of a primary data stream of an encrypted file, such as encrypted file 118 of FIG. 1. Consecutive data stream temporary file 144 also contains an encrypted content of a primary data stream 306, which includes data of a primary data stream of an encrypted file (such as encrypted file 118 of FIG. 1). Consecutive data stream temporary file 144 further contains an encryption stream name for an alternate data stream 308, which indicates that the data following is part of an alternate data stream associated with an encrypted file, such as encrypted file 118 of FIG. 1. Consecutive data stream temporary file 144 also contains an encrypted content of an alternate data stream 312, which includes data of an alternate data stream associated with an encrypted file, such as encrypted file 118 of FIG. 1.

Figure 4:
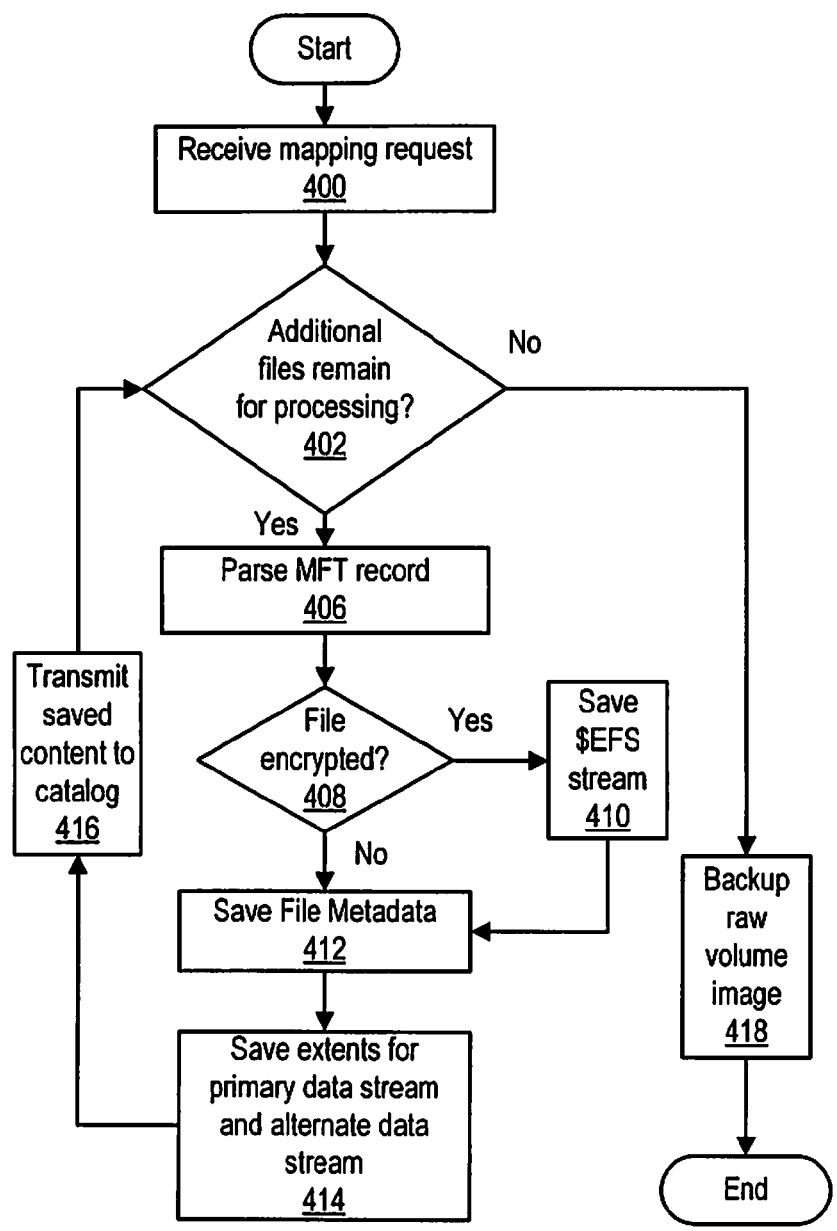
FIG. 4 is a flowchart of a procedure for mapping files of a virtual machine image for use with a method for restoring encrypted files from a virtual machine image according to one embodiment of the present invention.

FIG. 4 is a flowchart of a procedure for creating a map of files and directories within an image for use with a method for restoring encrypted files from a virtual machine image. The process starts at operation 400, which receives a mapping request. Returning to the embodiment illustrated in FIG. 1, a mapping request is received by backup and restore client module 112 from backup and restore server module 114 over Internet 110. A mapping request from backup and restore server module 114 might instruct backup and restore client module 112 to transmit mapping information for encrypted file 118 to backup and restore media module 116 for storage in catalog data 132 on backup media 128. In an alternative embodiment, a mapping request can be received from a user of backup and restore client 100 or from a program, such as an operating system (not shown) or an application 124 executing on backup and restore client 100.

Operation 400 includes receipt of information identifying a location of a virtual machine image, such as virtual machine image 142 of FIG. 1. Analysis, which, in one embodiment, is performed by a backup and restore client module such as backup and restore client module 112 of FIG. 1, is performed to determine the number of NTFS volumes that need to be processed. Each volume can processed by a backup and restore client module such as backup and restore client module 112 of FIG. 1 on the basis of the total number of MFT records. In one embodiment, mapping information is stored within the catalog data 132, so that individual files can be restored from a copy of a virtual image, such as copy of virtual image 126 of FIG. 1 through a single access to the MFT of the stored image.

Operation 402 determines, based on the request received in operation 400, whether additional files remain for processing. Operation 402, in one embodiment, is performed by a backup and restore client module such as backup and restore client module 112 of FIG. 1. Initially, a group of files will require processing, and that group will become smaller as each file is processed. Each MFT record can be processed, starting at from MFT record 0 to MFT record (n−1).

Operation 406 depicts parsing an MFT record, which represents an allocated file or directory, to create mapping information, which is stored (during operation 416). In one embodiment, operation 406 is performed by a backup and restore client module such as backup and restore client module 112 of FIG. 1. In the embodiment depicted in FIG. 1, this mapping information is stored in catalog data 132. Mapping information, which is collected in operation 406, is passed to backup and restore client module 112, which passes the information to backup and restore media module 116 for storage in catalog data 132 on backup media 128. The process next moves to operation 408.

Operation 408 determines whether the file for which an MFT record was parsed in operation 406 is encrypted. In one embodiment, catalog data includes information specifying whether the file is encrypted. In one embodiment, operation 408 is performed by a backup and restore client module such as backup and restore client module 112 of FIG. 1 through examining catalog data associated with the file for which the MFT record was parsed. If it is determined that the file is not encrypted, the process proceeds to operation 412, which is described below. If it is determined that the file is encrypted, the process proceeds to operation 410. Operation 410 collects the encrypted file stream ($EFS) from the parsed MFT record. In one embodiment, operation 410 is performed by a backup and restore client module such as backup and restore client module 112 of FIG. 1. The encrypted file system will be transmitted with the rest of the mapping information in operation 416. The process next moves to operation 412.

Operation 412 collects file metadata representing the attributes (e.g., a security descriptor) of a file or directory. In one embodiment, operation 412 is performed by a backup and restore client module such as backup and restore client module 112 of FIG. 1. The process next moves to operation 414, which collects extents for a primary data stream and alternate data stream(s). In one embodiment, operation 414 is performed by a backup and restore client module such as backup and restore client module 112 of FIG. 1. The process then proceeds to operation 416.

Operation 416 transmits saved content to a catalog by collecting the encrypted file stream from operation 410 (if any), the metadata from operation 412 (if any), and the extents from operation 414 (if any), and sending a transmission of the collected data in a data structure that represents the mapping information for a file or directory in a volume image. Returning to the embodiment illustrated in FIG. 1, the collected information is passed by backup and restore client module 112, which transmits the catalog information to backup and restore media module 116 for storage in catalog data 132 on backup media 128. The process then returns to operation 402.

Returning to operation 402, if no files remain for processing, the process proceeds to operation 418, which illustrates writing a backup of a virtual machine image. In the embodiment depicted in FIG. 1, once all catalog information has been written to catalog data 132 on backup media 128, virtual machine image 142 is passed from backup and restore client module 112 to backup and restore media module 116, which writes copy of virtual machine image 126 on backup media 128. The process then ends. If files remain for processing, the process proceeds to operation 406.

Figure 5:
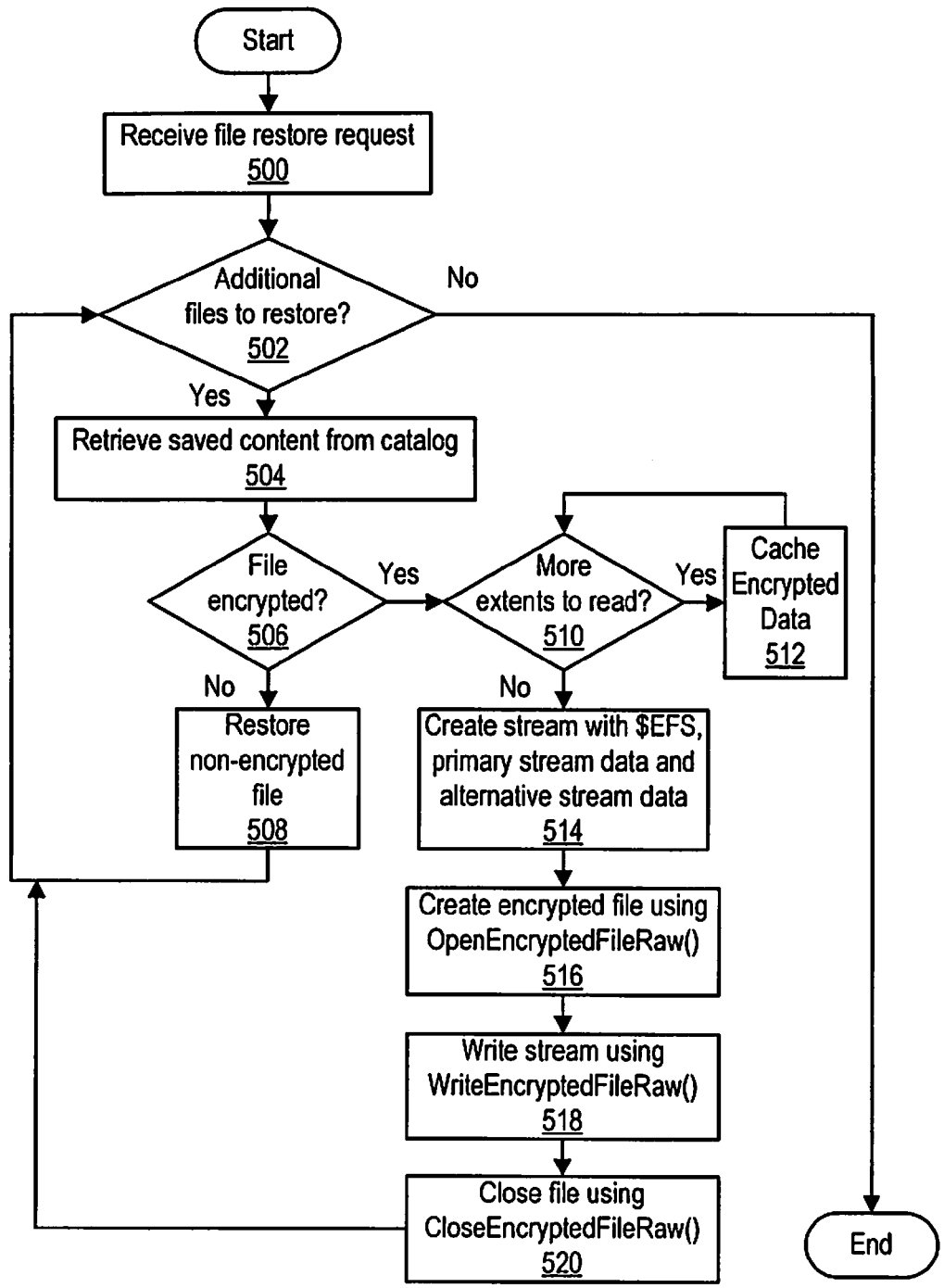
FIG. 5 is a flowchart of a procedure for restoring encrypted files from a virtual machine image according to one embodiment of the present invention.

FIG. 5 is a flowchart of a procedure for restoring encrypted files from a virtual machine image. In FIG. 5, functions are called with specifically enumerated commands, including OpenEncryptedFileRaw( ) WriteEncryptedFileRaw( ) and CloseEncryptedFileRaw( ) These commands represent non-limiting examples of application program interface commands available in an embodiment of a system running Microsoft Windows™. In other embodiments, other commands may be used.

The process starts at operation 500, which receives a file restore request. Returning to the embodiment illustrated in FIG. 1, a file restore request is received by backup and restore client module 112 from backup and restore server module 114 over Internet 110. A file restore request from backup and restore server module 114 may instruct backup and restore client module 112 to read extents of encrypted file 118 from data stored by backup and restore media module 116 as encrypted data sectors embedded in copy of virtual machine image 126 on backup media 128. In an alternative embodiment, a file restore request can be received from a user of backup and restore client 100 or from a program, such as an operating system (not shown) or an application 124, executing on backup and restore client 100.

Operation 502 determines, based on the request received in operation 500 and on a list of files already processed, whether additional files remain to restore. During an initial iteration of the operations represented by FIG. 5, a list or queue of the files for restoration will be present, and the queue or list will become smaller as each file is restored, eventually terminating when all files are restored. Returning to the embodiment illustrated in FIG. 1, determining whether additional files remain for processing is performed by backup and restore client module 112, which determines whether additional files need to be restored. In an alternative embodiment, backup and restore client module 112 determines whether instructions received from a user of backup and restore client 100 or from a program, such as an operating system (not shown) or an application 124 executing on backup and restore client 100 require receipt of additional files from backup and restore media module 116, the files having been stored within volume image 126 on backup media 128. If it is determined that no files remain for restoration, then the process ends. If, however, it is determined that additional files need to be restored, the process next proceeds to step 504.

Operation 504 retrieves saved mapping information content from catalog data 132. Returning to the embodiment illustrated in FIG. 1, backup and restore client module 112 requests mapping information for a specific file/directory from backup and restore media module 116, which retrieves catalog information from catalog data 132 on backup media 128. Returning to the embodiment illustrated in FIG. 4, the catalog information contains of the data saved from operation 416. The process next moves to operation 506.

Operation 506 determines whether the file for which the catalog information was collected in operation 504 is encrypted. In one embodiment, operation 506 is performed by backup and restore client module 112. If it is determined that the file is encrypted, the process proceeds to operation 510, which is described below. If it is determined that the file is not encrypted, the process proceeds to operation 508.

Operation 508 restores a non-encrypted file. Returning to the embodiment illustrated in FIG. 1, the unencrypted extents of unencrypted file 120 are read from copy of virtual machine image 126 by backup and restore media module 116 and written to a local volume (not shown) by backup and restore client module 112. The process then returns to operation 502.

Operation 510 determines whether there are additional encrypted extents to read. Returning to the embodiment illustrated in FIG. 1, backup and restore client module 112 determines whether there are additional file extents to read by analyzing catalog information received from catalog data 132, which includes the locations and sizes of the encrypted data extents of the file currently being restored. If is determined that there are no additional encrypted extents to read, the process proceeds to step 514, which is described below. If is determined that there are additional file extents to read, the process moves to operation 512.

Operation 512 caches encrypted data. Returning to the embodiment illustrated in FIG. 1, backup and restore client module 112 requests reading of extents from backup and restore media module 116, which reads the sectors from copy of virtual machine image 126. The encrypted data received is cached in memory or a local temporary file. The process then returns to operation 510.

Operation 514 creates a stream in a consecutive data stream temporary file. In one embodiment, the consecutive data stream temporary file is compatible with the Microsoft Windows Encrypted File System. Returning to the embodiment depicted in FIG. 1, consecutive data stream temporary file 144 is created by encrypted image handler 134 and embeds encrypted file system data that was collected in operation 410 as well as the primary stream data and any alternative data streams. Encrypted image handler 134 creates consecutive data stream temporary file 144 writing the selected data in a single, continuous file. The process next proceeds to operation 516.

Operation 516 creates an encrypted file on a local volume. Returning to the embodiment illustrated in FIG. 1, backup and restore client module 112 executes an OpenEncryptedFileRaw( ) command to create the encrypted file. The process then moves to operation 518.

Operation 518 depicts writing a stream to an encrypted file. In one embodiment, backup and restore client module 112 executes a WriteEncryptedFileRaw( ) command to write the content of consecutive data stream temporary file 144 to the encrypted file created in operation 516. The process then moves to operation 520.

Operation 520 illustrates closing the encrypted file. In one embodiment, backup and restore client module 112 executes an CloseEncryptedFileRaw( ) command to close the encrypted file created in operation 516. The process then returns to operation 502.

Figure 6:
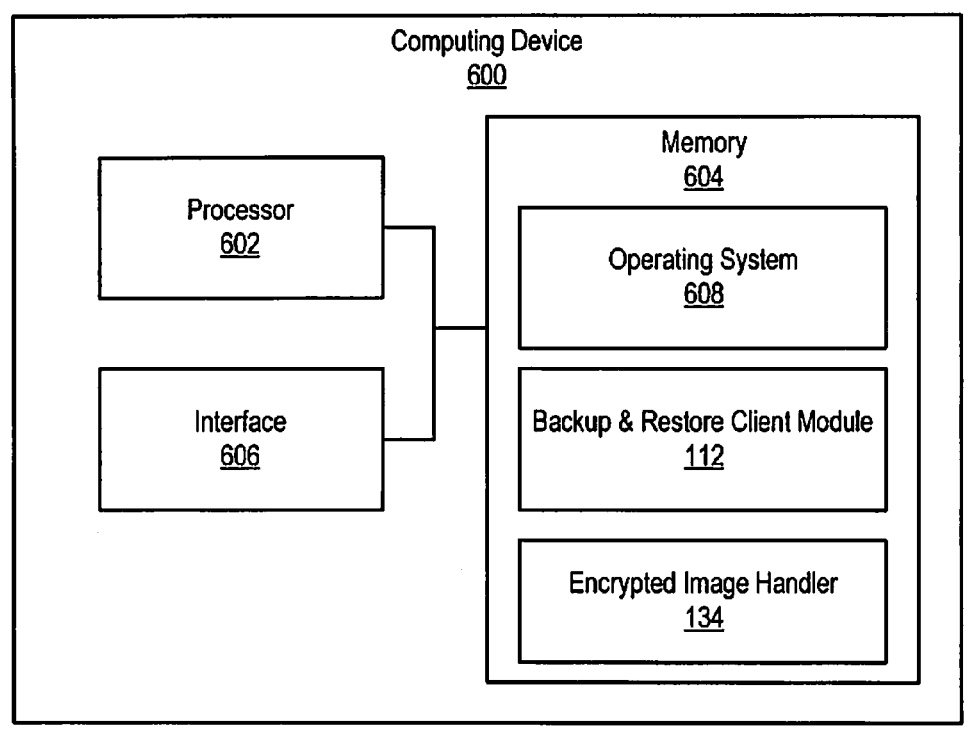
FIG. 6 depicts a block diagram of a computer system configured for restoring encrypted files from a virtual machine image according to one embodiment of the present invention.

FIG. 6 depicts a block diagram of a computer, which implements backup and restore client module 112 and encrypted image handler 134 on backup and restore client 100 (or, alternatively, backup and restore server module 114 on backup and restore server 104). Computing device 600 can also implement backup and restoration media module 116 on media server 110 of FIG. 1.

As illustrated, computing device 600 includes one or more processors 602 (e.g., microprocessors, PLDs (Programmable Logic Devices), or ASICs (Application Specific Integrated Circuits)) configured to execute program instructions stored on or in a computer-readable medium such as memory 604. Memory 604 can include various types of RAM (Random Access Memory), ROM (Read Only Memory), Flash memory, MEMS (Micro Electro-Mechanical Systems) memory, and the like. Computing device 600 also includes one or more interfaces 606 and operating system 608. Processor 602, memory 604, and interface 606 are coupled to send and receive data and control signals by a bus or other interconnect.

Interface(s) 606 can include an interface to a storage device on which information, such as volume image 140 on which unencrypted file 120, is stored. Alternatively, backup and restore client module 112 may be stored on a storage device coupled to interface 606. Interface(s) 606 can also include an interface to a network (e.g., network 108 or Internet 110 of FIG. 1) for use in communicating with a server (e.g., media server 110 of FIG. 1).

The program instructions and data implementing backup and restore client module 112 and encrypted image handler 134 can be stored on various computer readable storage media such as memory 604. In some embodiments, such software is stored on a computer readable storage medium such as a CD (Compact Disc), DVD (Digital Versatile Disc), hard disk, optical disk, tape device, floppy disk, and the like). In order to be executed by processor 602, the instructions and data implementing backup and restore client module 112 and encrypted image handler 134 are loaded into memory 604 from the other computer readable medium. The instructions and/or data can also be transferred to computing device 600 for storage in memory 604 via a network such as the Internet or upon a carrier medium. In some embodiments, a network and/or a wireless link is used to convey signals such as electrical, electromagnetic, or digital signals, including data and instructions implementing backup and restore client module 102 and encrypted image handler 134.

Although various embodiments of the invention have been described, the method, system and computer program product for restoring encrypted files from a virtual machine image are not intended to be limited to the specific forms set forth herein. On the contrary, they are intended to cover such alternatives, modifications, and equivalents as is reasonably included within the scope of the method, system and computer program product for restoring encrypted files from a virtual machine image as defined by the appended claims.

What is claimed is:

1. A method, performed by a processor, wherein the method comprises:
in response to a request to restore an encrypted file, identifying that the encrypted file is one of a plurality of files stored in a virtual machine image, and
restoring the encrypted file, wherein
the restoring the encrypted file is performed without having to restore the entire virtual machine image, and
the restoring the encrypted file comprises
accessing a file table record for the encrypted file, wherein
the encrypted file is one of the plurality of files within the virtual machine image,
the encrypted file is divided into a plurality of file segments, and
the file table record comprises an encrypted file stream and extent information identifying a location of each of the plurality of file segments of the encrypted file in the virtual machine image,
retrieving the plurality of file segments of the encrypted file from the virtual machine image, and
storing a consecutive data stream, wherein
the storing the consecutive data stream comprises encapsulating the encrypted file stream and the plurality of file segments of the encrypted file.

2. The method of claim 1, wherein the restoring the encrypted file further comprises:
writing the consecutive data stream to a restored file in a file system, wherein
the encapsulating the encrypted file stream and the plurality of file segments of the encrypted file comprises storing within the consecutive data stream an encryption header and data representing a primary data stream, and
the data representing the primary data stream comprises an encryption stream name of the primary data stream and encrypted content of the primary data stream.

3. The method of claim 2, wherein
the encapsulating the encrypted file stream and the plurality of file segments of the encrypted file comprises storing within the consecutive data stream data representing an alternate data stream, and
the data representing the alternate data stream comprises an encryption stream name of the alternate data stream and encrypted content of the alternate data stream.

4. The method of claim 3, wherein the accessing the file table record for the encrypted file further comprises:
retrieving catalog information associated with the encrypted file;
determining from the catalog information that the encrypted file is encrypted; and
retrieving from within the catalog information the encrypted file stream of the encrypted file, wherein
the encrypted file stream comprises a public encryption key.

5. The method of claim 4, wherein the accessing the file table record for the encrypted file further comprises:
retrieving from within the file table record the extent information identifying the location of the plurality of file segments of the encrypted file in the virtual machine image, wherein
the extent information identifying the location of the plurality of file segments of the encrypted file in the virtual machine image comprises a plurality of sector locations for the primary data stream.

6. The method of claim 5, wherein the extent information identifying the location of the plurality of file segments of the encrypted file in the virtual machine image comprises a plurality of sector locations for the alternate data stream.

7. The method of claim 4, wherein
the encrypted content of the alternate data stream comprises a symmetric private file encryption key, and
the storing the consecutive data stream further comprises storing the consecutive data stream as content of a temporary file in the file system.

8. An apparatus comprising:
computer-readable storage means for storing a master file table;
means for, in response to a request to restore the encrypted file,
identifying that the encrypted file is one of a plurality of files stored in a virtual machine image, and
restoring the encrypted file, wherein
the restoring the encrypted file is performed without having to restore the entire virtual image, and
the means for restoring the encrypted file comprises
means for accessing a file table record for the encrypted file, wherein
the encrypted file is one of the plurality of files within the virtual machine image,
the encrypted file is divided into a plurality of file segments, and
the file table record comprises an encrypted file stream and extent information identifying a location of each of the plurality of file segments of the encrypted file in the virtual machine image,
means for retrieving the plurality of file segments of the encrypted file from the virtual machine image, and
means for storing a consecutive data stream, wherein
the means for storing the consecutive data stream comprises means for encapsulating the encrypted file stream and the plurality of file segments of the encrypted file.

9. The apparatus of claim 8, wherein the means for restoring the encrypted file further comprises:
means for writing the consecutive data stream to a restored file in a file system, wherein
the means for encapsulating the encrypted file stream and the plurality of file segments of the encrypted file comprises means for storing within the consecutive data stream an encryption header and data representing a primary data stream, and
the data representing the primary data stream comprises an encryption stream name of the primary data stream and encrypted content of the primary data stream.

10. The apparatus of claim 9, wherein
the means for encapsulating the encrypted file stream and the plurality of file segments of the encrypted file comprises means for storing within the consecutive data stream data representing an alternate data stream, and
the data representing the alternate data stream comprises an encryption stream name of the alternate data stream and encrypted content of the alternate data stream.

11. The apparatus of claim 10, wherein the means for accessing the file table record for the encrypted file further comprises:
means for retrieving catalog information associated with the encrypted file;
means for determining from the catalog information that the encrypted file is encrypted; and
means for retrieving from within the catalog information the encrypted file stream of the encrypted file, wherein the encrypted file stream comprises a public encryption key.

12. The apparatus of claim 11, wherein the means for accessing the file table record for the encrypted file further comprises:
means for retrieving from within the file table record the extent information identifying the location of the plurality of file segments of the encrypted file in the virtual machine image, wherein
the extent information identifying the location of the plurality of file segments of the encrypted file in the virtual machine image comprises a plurality of sector locations for the primary data stream.

13. The apparatus of claim 12, wherein the extent information identifying the location of the plurality of file segments of the encrypted file in the virtual machine image comprises a plurality of sector locations for the alternate data stream.

14. The apparatus of claim 10, wherein
the encrypted content of the alternate data stream comprises a symmetric private file encryption key, and
the means for storing the consecutive data stream further comprises means for storing the consecutive data stream as a content of a temporary file in the file system.

15. A non-transitory computer readable storage medium, the non-transitory computer readable storage medium storing instructions that when executed by a processor cause the processor to perform a method comprising:
in response to a request to restore an encrypted file,
identifying that the encrypted file is one of a plurality of files stored in a virtual machine image, and
restoring the encrypted file, wherein
the restoring the encrypted file is performed without having to restore the entire virtual machine image, and
the restoring the encrypted file comprises
accessing a file table record for the encrypted file, wherein
the encrypted file is one of the plurality of files within the virtual machine image,
the encrypted file is divided into a plurality of file segments, and
the file table record comprises an encrypted file stream and extent information identifying a location of each of the plurality of file segments of the encrypted file in the virtual machine image,
retrieving the plurality of file segments of the encrypted file from the virtual machine image, and
storing a consecutive data stream, wherein
the storing the consecutive data stream comprises encapsulating the encrypted file stream and the plurality of file segments of the encrypted file.

16. The non-transitory computer-readable storage medium of claim 15, wherein the method for restoring the encrypted file further comprises:
writing the consecutive data stream to a restored file in a file system, wherein
the encapsulating the encrypted file stream and the plurality of file segments of the encrypted file comprises storing within the consecutive data stream an encryption header and data representing a primary data stream, and
the data representing the primary data stream comprises an encryption stream name of the primary data stream and encrypted content of the primary data stream.

17. The non-transitory computer-readable storage medium of claim 16, wherein
the method for encapsulating the encrypted file stream and the plurality of file segments of the encrypted file comprises storing within the consecutive data stream data representing an alternate data stream, and
the data representing the alternate data stream comprises an encryption stream name of the alternate data stream and encrypted content of the alternate data stream.

18. The non-transitory computer-readable storage medium of claim 17, wherein the method for accessing the file table record for the encrypted file further comprises:
retrieving catalog information associated with the encrypted file;
for determining from the catalog information that the encrypted file is encrypted, and
retrieving from within the catalog information the encrypted file stream of the encrypted file, wherein the encrypted file stream comprises a public encryption key.

19. The non-transitory computer-readable storage medium of claim 18, wherein the method for accessing the file table record for the encrypted file further comprises:
retrieving from within the file table record the extent information identifying the location of the plurality of file segments of the encrypted file in the virtual machine image, wherein
the extent information identifying the location of the plurality of file segments of the encrypted file in the virtual machine image comprises a plurality of sector locations for the primary data stream.

20. The non-transitory computer-readable storage medium of claim 19, wherein
the extent information identifying the location of the plurality of file segments of the encrypted file in the virtual machine image comprises a plurality of sector locations for the alternate data stream.

\* \* \* \* \*

UNITED STATES PATENT AND TRADEMARK OFFICE
CERTIFICATE OF CORRECTION

| | |
|---|---|
| PATENT NO. | : 8,930,423 B1 |
| APPLICATION NO. | : 12/346133 |
| DATED | : January 6, 2015 |
| INVENTOR(S) | : Sridhar Surampudi and Timothy M. Naftel |

It is certified that error appears in the above-identified patent and that said Letters Patent is hereby corrected as shown below:

In the Claims:

Column 15
Line 15, in Claim 18, replace: "for determining" by: -- determining --

Signed and Sealed this
Twenty-fourth Day of May, 2016

Michelle K. Lee
*Director of the United States Patent and Trademark Office*